(12) United States Patent
Sivaraj et al.

(10) Patent No.: US 9,900,247 B2
(45) Date of Patent: Feb. 20, 2018

(54) MEDIA ACCESS CONTROL ADDRESS AND INTERNET PROTOCOL ADDRESS BINDING PROXY ADVERTISEMENT FOR NETWORK DEVICES OF A NETWORK

(71) Applicant: Juniper Networks, Inc., Sunnyvale, CA (US)

(72) Inventors: Selvakumar Sivaraj, Sunnyvale, CA (US); Wen Lin, Andover, MA (US); Ravi Shekhar, Sunnyvale, CA (US); Vasudevan Venkatraman, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 170 days.

(21) Appl. No.: 15/012,057

(22) Filed: Feb. 1, 2016

(65) Prior Publication Data

US 2017/0195220 A1 Jul. 6, 2017

(30) Foreign Application Priority Data

Dec. 30, 2015 (IN) .......................... 7084/CHE/2015

(51) Int. Cl.
*H04L 12/721* (2013.01)
*H04L 29/12* (2006.01)
*H04W 48/16* (2009.01)

(52) U.S. Cl.
CPC ............ *H04L 45/66* (2013.01); *H04L 61/103* (2013.01); *H04L 61/2007* (2013.01); *H04W 48/16* (2013.01); *H04L 61/6022* (2013.01)

(58) Field of Classification Search
CPC ... H04L 45/66; H04L 61/103; H04L 61/2007; H04L 61/6022; H04W 48/16
See application file for complete search history.

(56) References Cited

U.S. PATENT DOCUMENTS

2013/0254359 A1* 9/2013 Boutros ................ H04L 61/103
709/223
2015/0172156 A1* 6/2015 Lohiya .................. H04L 61/103
709/224

(Continued)

OTHER PUBLICATIONS

Internet Working Group, Internet Draft, "Provider Backbone Bridging Combined with Ethernet VPN (PBB-EVPN)"; draft-ietf-l2vpn-pbb-evpn-10; Sajassi et al.; May 14, 2015.*

(Continued)

*Primary Examiner* — Benjamin H Elliott, IV
(74) *Attorney, Agent, or Firm* — Harrity & Harrity, LLP

(57) ABSTRACT

A device may receive, via a first message, first route information for directing network traffic for a network. The first route information may identify a media access control (MAC) route corresponding to a MAC address associated with a host device connecting to a subnet of the network. The first route information may fail to include Internet protocol (IP)/MAC binding information associated with the host device. The device may transmit a request for IP/MAC binding information associated with the host device. The device may receive a response, to the request for IP/MAC binding information, identifying the IP/MAC binding information. The device may advertise, via a second message, second route information for directing network traffic for the network based on receiving the response identifying the IP/MAC binding information. The second route information may identify the IP/MAC binding information associated with the host device.

20 Claims, 5 Drawing Sheets

(56) References Cited

U.S. PATENT DOCUMENTS

2016/0285761 A1* 9/2016 Dong .................. H04L 12/4666
2017/0142613 A1* 5/2017 Singh .................... H04W 28/08
2017/0171057 A1* 6/2017 Dong ...................... H04L 45/02
2017/0195210 A1* 7/2017 Jacob .................. H04L 12/4625
2017/0195220 A1* 7/2017 Sivaraj .................... H04L 45/66

OTHER PUBLICATIONS

Rabadan et al., "Operational Aspects of Proxy-ARP/ND in EVPN Networks; draft-snr-bess-evpn-proxy-arp-nd-02.txt," Oct. 6, 2015, 22 pages.
Cisco, "IP Routing: BGP Configuration Guide, Cisco IOS Release 15S—BGP PBB EVPN Route Reflector Support [Cisco IOS 15.5S]—Cisco," Nov. 30, 2015, 7 pages.
Sajassi et al., "BGP MPLS-Based Ethernet VPN; rfc7432.txt.," Feb. 18, 2015, 56 pages.
Extended European Search Report corresponding to EP 16207414.0 dated Jun. 1, 2017, 9 pages.

\* cited by examiner

MEDIA ACCESS CONTROL ADDRESS AND INTERNET PROTOCOL ADDRESS BINDING PROXY ADVERTISEMENT FOR NETWORK DEVICES OF A NETWORK

RELATED APPLICATION(S)

This application claims priority under 35 U.S.C. § 119 to Indian Provisional Patent Application No. 7084/CHE/2015, filed on Dec. 30, 2015, the content of which is incorporated by reference herein in its entirety.

BACKGROUND

A network device may receive network traffic (e.g., a set of packets) for routing via a network. For example, the network device may receive the network traffic from a host network device (e.g., via one or more other network devices) for routing to a subnet of the network. The network traffic may be associated with a media access control (MAC) address associated with a MAC route. The network device may utilize an address resolution protocol (ARP) message to identify an Internet protocol (IP)/MAC binding for routing the network traffic and/or response network traffic (e.g., one or more other packets) in the network. For example, the network device may identify an IP address corresponding to the MAC route associated with the network traffic. The network device may direct the network traffic toward the subnet of the network based on determining the IP/MAC binding.

SUMMARY

According to some possible implementations, a device may include one or more processors. The one or more processors may receive, via a first message, first route information for directing network traffic for a network. The first route information may identify a media access control (MAC) route corresponding to a MAC address associated with a host device connecting to a subnet of the network. The first route information may fail to include Internet protocol (IP)/MAC binding information associated with the host device. The one or more processors may transmit a request for IP/MAC binding information associated with the host device. The one or more processors may receive a response, to the request for IP/MAC binding information, identifying the IP/MAC binding information. The one or more processors may advertise, via a second message, second route information for directing network traffic for the network based on receiving the response identifying the IP/MAC binding information. The second route information may identify the IP/MAC binding information associated with the host device.

According to some possible implementations, a non-transitory computer-readable medium may store one or more instructions that, when executed by one or more processors, may cause the one or more processors to receive a first message identifying a media access control (MAC) route associated with directing network traffic for a host device. The message may not include Internet protocol (IP)/MAC binding information associated with identifying an IP address corresponding to the MAC route. The one or more instructions, when executed by the one or more processors, may cause the one or more processors to determine the IP/MAC binding information based on the MAC route included in the first message. The one or more instructions, when executed by the one or more processors, may cause the one or more processors to transmit a second message identifying the IP/MAC binding information based on determining the IP/MAC binding information to one or more network devices. The one or more network devices may be caused to forbear transmission of one or more messages associated with determining the IP/MAC binding information based on receiving the second message.

According to some possible implementations, a method may include receiving, by a device, a message, including information identifying a media access control (MAC) address associated with a first network device, from a second network device. The first network device may be connected to the second network device. The message may not include information identifying an Internet protocol (IP) address corresponding to the MAC address. The method may include determining, by the device, the IP address corresponding to the MAC address based on receiving the message including the information identifying the MAC address. The method may include advertising, by the device, the IP address corresponding to the MAC address to cause another device, which receives the advertising, to utilize the IP address for routing traffic associated with the first network device.

DETAILED DESCRIPTION

Figure 1A:
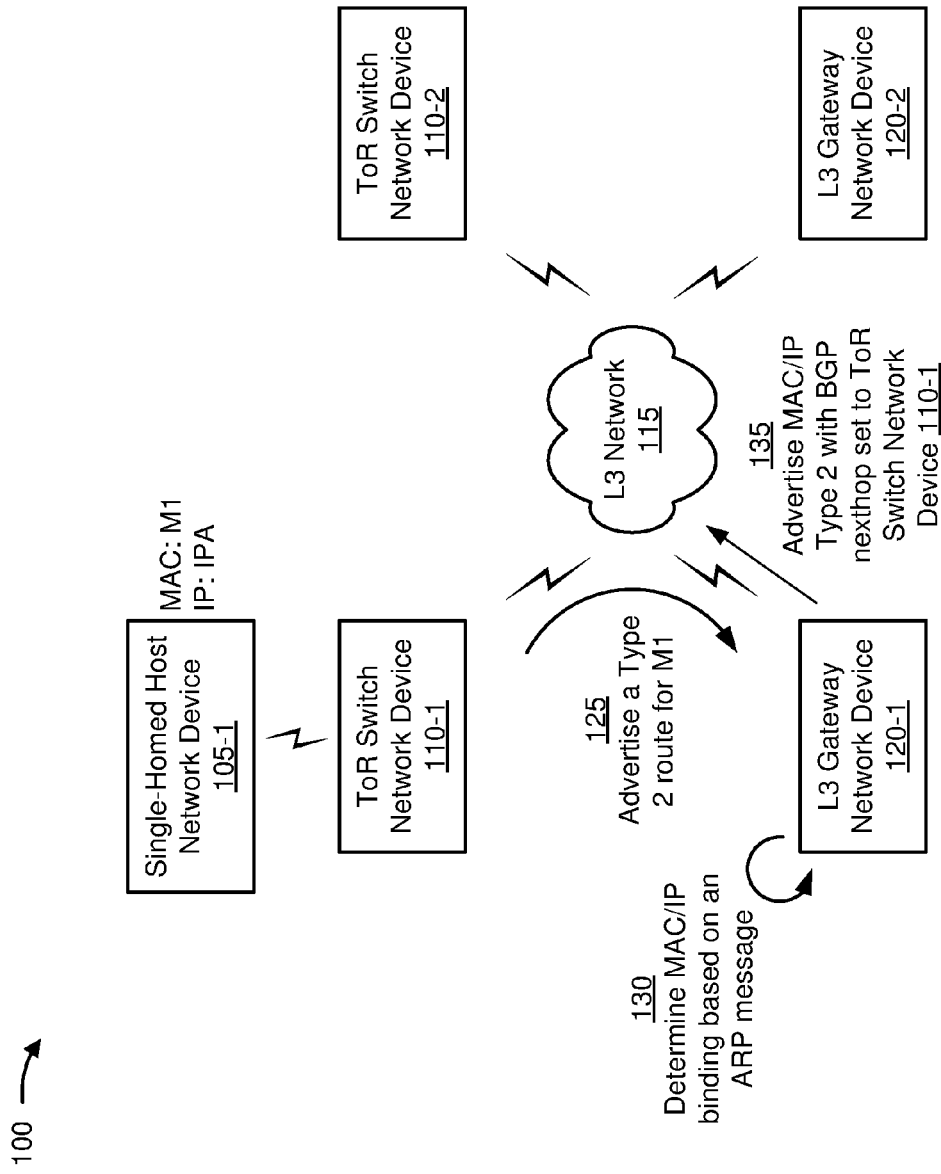
FIGS. 1A and 1B are diagrams of an overview of an example implementation described herein.

The following detailed description of example implementations refers to the accompanying drawings. The same reference numbers in different drawings may identify the same or similar elements.

A network device (e.g., a provider edge network device, such as a gateway network device or the like) may be connected to a network, which includes a set of other network devices. The gateway network device may receive route information from another network device (e.g., a provider edge network device, such as a Top of Rack (ToR) switch network device or the like). For example, the ToR switch network device may determine a media access control (MAC) address and a corresponding MAC route (e.g., reachability information, such as network layer reachability information (NLRI)), and may advertise the route information to the gateway network device via a layer 2 (L2) route message to cause the gateway network device to route the network traffic from a first segment of a virtual extensible local area network (VXLAN) to a second segment of the VXLAN. The route information may include information identifying the MAC route. Layer 2 may refer to a layer of the Open Systems Interconnection (OSI) model. The MAC route information may be associated with layer 3 (L3) Internet protocol (IP) address information for the VXLAN. However, the ToR switch network device may lack sufficient computing resources to determine and include IP/MAC binding information in the route information. The IP/MAC binding information, sometimes referred to as MAC-to-IP binding information, may include information that identifies particular IP address information corresponding to particular MAC route information.

The network device may utilize an address resolution protocol (ARP) message to determine the IP/MAC binding for a received MAC route when network traffic is received at the network. For example, when network traffic is received at the network, the ToR switch network device may advertise a particular MAC route for the network traffic to the gateway network device, and the gateway network device may transmit an ARP message. The gateway network device may receive a response to the ARP message associated with identifying an IP/MAC binding for the MAC route.

However, when the network includes multiple gateway network devices (e.g., redundant gateway network devices), each gateway network device may be required to transmit an ARP message and receive an ARP response to identify a common IP/MAC binding as a result of the ToR switch network device failing to advertise the IP/MAC binding. Moreover, when the gateway network device is disabled for the network and subsequently enabled for the network, the gateway network device may be routed network traffic associated with a host network device and may, again transmit ARP messages to resolve IP/MAC bindings, although other redundant gateway network devices may have already resolved the IP/MAC bindings and may be available to route the network traffic.

Implementations, described herein, may utilize a proxy IP/MAC advertisement from a gateway network device to other network devices (e.g., other provider edge network devices, such as ToR switch network devices, other gateway network devices, or the like) of a network to permit routing of network traffic for the network. In this way, a quantity of network traffic associated with transmitting ARP messages and receiving responses to ARP messages may be reduced relative to utilizing the ARP messages to determine IP/MAC binding for each provider edge network device, thereby improving network performance. Moreover, when a network device is removed from or added to the network, a period of time required by the network device to resolve IP/MAC bindings may be reduced relative to utilizing the ARP messages or the network traffic may be directed to a network device that has already received information identifying the IP/MAC binding, thereby reducing a likelihood that network traffic is lost and improving network performance.

Figure 1B:
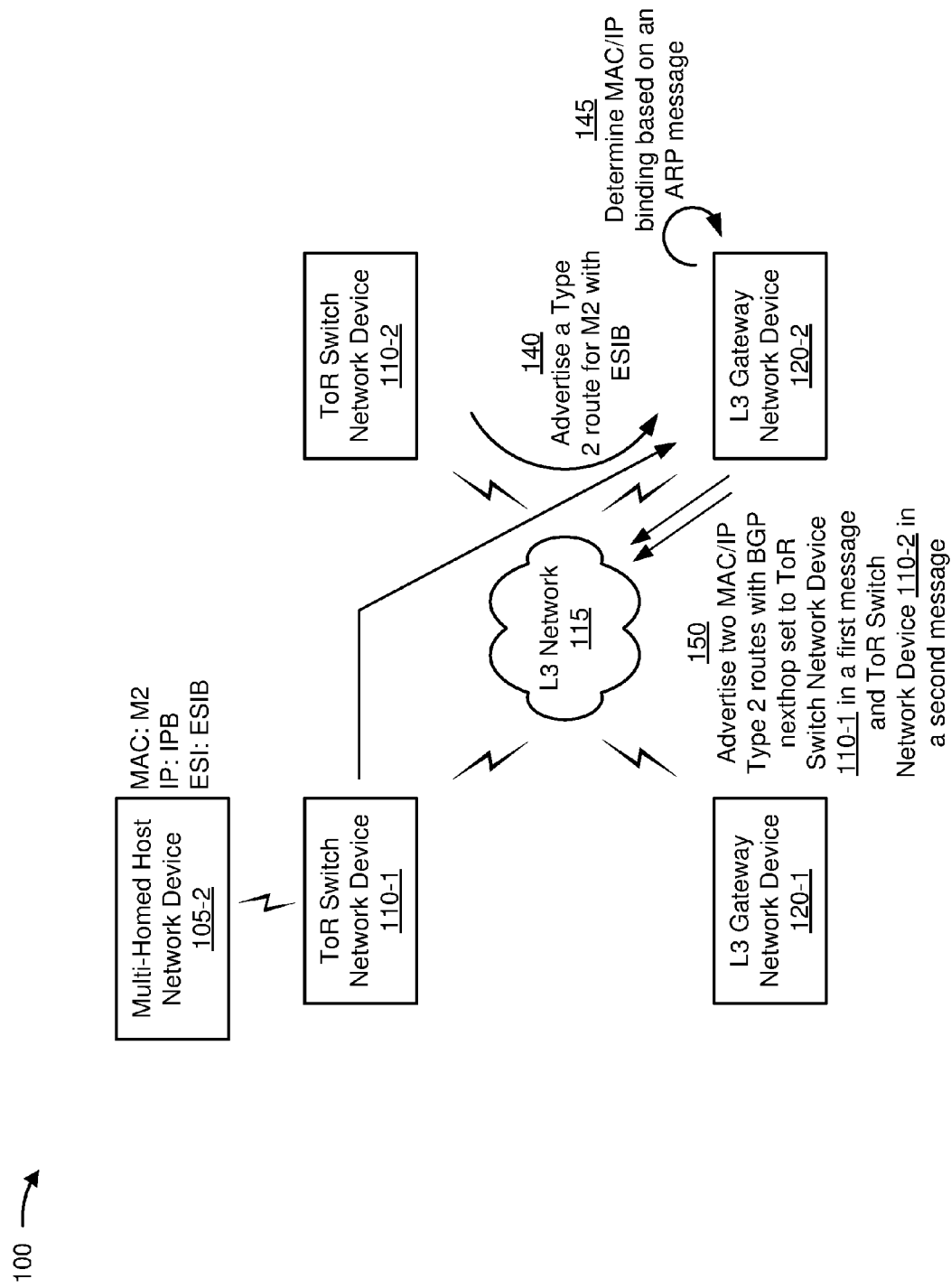

FIGS. 1A and 1B are diagrams of an overview of an example implementation 100 described herein. As shown in FIG. 1A, example implementation 100 may include a single-homed host network device 105-1, a ToR switch network device 110-1, a ToR switch network device 110-2, an L3 network 115, an L3 gateway network device 120-1, and an L3 gateway network device 120-2. ToR switch network device 110-1 and/or ToR switch network device 110-2 may include ToR switches (e.g., Ethernet virtual private network (EVPN)-VXLAN provider edge devices) for L3 network 115. L3 network 115 may include an EVPN-VXLAN. For example, L3 network 115 may bridge L2 and L3 functionalities for a cloud-based computing and routing network. L3 gateway network device 120-1 and L3 gateway network device 120-2 may include gateways (e.g., EVPN-VXLAN provider edge devices) providing a redundant L3 gateway functionality. L3 gateway network device 120-1 and L3 gateway network device 120-2 may include configuration information identifying ToR switch network device 110-1 and ToR switch network device 110-2 as L2 only EVPN network devices. Single-homed host network device 105-1 may connect to ToR switch network device 110-1, and may be associated with an IP address (IPA) and a MAC route (M1).

As further shown in FIG. 1A, and by reference number 125, ToR switch network device 110-1 may advertise an EVPN type 2 route for MAC route M1. An EVPN type 2 route may refer to a particular type of EVPN message information that permits, but does not require, both an IP address and a MAC address (e.g., an IP/MAC binding) to be advertised as reachability information for routing network traffic. For example, based on lacking processing resources to determine IP/MAC binding for single-homed host network device 105-1 (and each other network device connected to ToR switch network device 110-1), ToR switch network device 110-1 advertises the EVPN type 2 route with MAC address information and without resolving and including IP/MAC binding information.

As further shown in FIG. 1A, and by reference number 130, L3 gateway network device 120-1 may receive the advertised information identifying the EVPN type 2 route for MAC route M1, and may resolve an IP/MAC binding for the MAC route M1. For example, the L3 gateway network device 120-1 may determine that the MAC address corresponding to MAC route M1 binds to the IP address IPA. In this case, L3 gateway network device 120-1 may resolve the IP/MAC binding based on transmitting an ARP message. For example, L3 gateway network device 210-1 may transmit an ARP request message and may receive an ARP response message including the IP/MAC binding information. In another example, L3 gateway network device 120-2 may receive the advertised information identifying the EVPN type 2 route for MAC address M1, and may resolve the IP/MAC binding for the MAC route M1.

As further shown in FIG. 1A, and by reference number 135, L3 gateway network device 120-1 may advertise an EVPN type 2 route including IP/MAC binding information based on resolving the IP/MAC binding. L3 gateway network device 120-1 may provide the EVPN type 2 route including IP/MAC binding information to other network devices associated with L3 network 115, such as a set of provider edge devices associated with L3 network 115 (e.g., L3 gateway network device 120-2 or the like). In this case, the other network devices associated with L3 network 115 may be caused to utilize information of the EVPN type 2 route including IP/MAC binding information rather than transmitting a set of ARP messages and receiving a set of ARP responses when the other network devices associated with L3 network 115 receive network traffic associated with MAC route M1. For example, L3 gateway network device 120-2 may, when receiving network traffic associated with single-homed host network device 105-1, utilize stored information of the EVPN type 2 route including IP/MAC binding information to route the network traffic from a first VXLAN segment to a second VXLAN segment, to ToR switch network device 110-1 for routing to single-homed host network device 105, or the like. In this way, L3 gateway network device 120-1 provides reachability information for routing of network traffic for L3 network 115, thereby reducing a quantity of ARP messages transmitted and received by other network devices of L3 network 115.

As shown in FIG. 1B, in a similar configuration of L3 network 115, ToR switch network device 110-1 and ToR switch network device 110-2 may connect to multi-homed host network device 105-2. Assume that multi-homed host network device 105-2 is associated with an IP address (IPB), a MAC route (M2), and an Ethernet segment identifier (ESI) value ESIB. As shown by reference number 140, ToR switch network device 110-1 and/or ToR switch network device 110-2 may advertise an EVPN type 2 route for MAC route M2 and ESI value ESIB and may fail to include information identifying an IP/MAC binding for MAC route M2. As shown by reference number 145, L3 gateway network device 120-2 may receive the advertised information identifying the EVPN type 2 route for MAC route M2, and may resolve an IP/MAC binding for MAC route M2 based on transmitting an ARP message. For example, L3 gateway network device 210-2 may transmit an ARP request message and may receive an ARP response message including the IP/MAC binding information. In another example, L3 gateway network device 120-2 may receive the information identifying the EVPN type 2 route for MAC route M2, and may resolve the IP/MAC binding for the MAC route M2.

As further shown in FIG. 1B, and by reference number 150, L3 gateway network device 120-2 may advertise a first EVPN type 2 route including IP/MAC binding information, ESI value ESIB and a border gateway protocol (BGP) nexthop attribute configured to identify ToR switch network device 110-1. L3 gateway network device 120-2 may advertise a second EVPN type 2 route including IP/MAC binding information with ESI value ESIB and with a BGP nexthop attribute configured to identify ToR switch network device 110-2. L3 gateway network device 120-2 may advertise the first EVPN type 2 route and/or the second EVPN type 2 route to other network devices associated with L3 network 115, such as a set of provider edge devices associated with L3 network 115 (e.g., L3 gateway network device 120-1 or the like). In this case, the other network devices associated with L3 network 115 may be caused to utilize the first EVPN type 2 route or the second EVPN type 2 route rather than transmitting a set of ARP messages when the other network devices receive network traffic associated with multi-homed host network device 105-2.

In this way, L3 gateway network device 120-1 and/or L3 gateway network device 120-2 may reduce a quantity of ARP messages transmitted via L3 network 115 relative to each network device being required to transmit an ARP message to resolve an IP/MAC binding, thereby improving network performance and reducing a likelihood of packet loss for L3 network 115.

As indicated above, FIGS. 1A and 1B are provided merely as an example. Other examples are possible and may differ from what was described with regard to FIGS. 1A and 1B.

Figure 2:
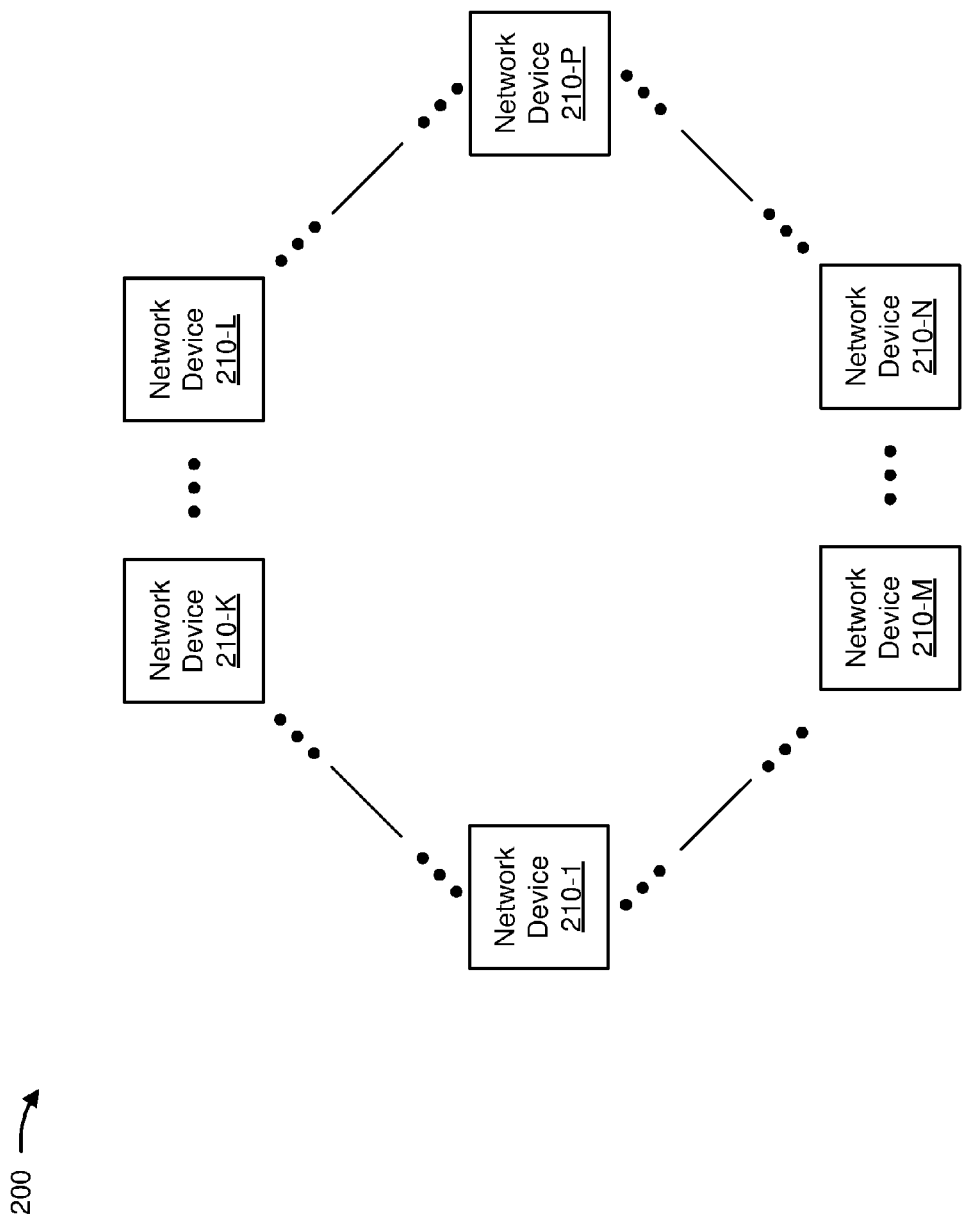
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices (e.g., one or more traffic transfer devices) capable of processing and/or transferring traffic between endpoint devices. For example, network device 210 may include a firewall, a router, a gateway, a switch device, a hub, a bridge, a reverse proxy, a server (e.g., a proxy server), a ToR switch, a load balancer, a user device, or a similar device. In some implementations, network device 210 may include a traffic transfer device associated with providing and/or receiving information via BGP. For example, network device 210 may include a provider edge device (e.g., a PE), a customer edge device, a route reflector device, a peer device, an autonomous system boundary router, or the like. In some implementations, network device 210 may include a host device associated with providing network traffic to and/or receiving network traffic from a network that includes a set of network devices 210. For example network device 210 may include a server, a data storage device, a bare-metal device, or the like. In some implementations, network device 210 may include a traffic transfer device associated with identifying an IP/MAC binding via one or more ARP messages.

In some implementations, network device 210 may be configured in association with a particular layer of the set of layers associated with the OSI model. For example, network device 210 may include an EVPN-VXLAN provider edge device (e.g., a ToR switch) configured as an L2 only EVPN device. Similarly, network device 210 may include an EVPN-VXLAN provider edge device (e.g., a gateway device) configured as an L3 gateway device. In some implementations, network device 210 may be associated with a network configuration. For example, network device 210 may be associated with a particular MAC address, a particular IP address, a particular ESI value, or the like. In some implementations, network device 210 may correspond to single-homed host network device 105-1 of FIG. 1A; ToR switch network device 110-1, ToR switch network device 110-2, L3 gateway network device 120-1, or L3 gateway network device 120-2 of FIGS. 1A and 1B; or multi-homed host network device 105-2 of FIG. 1B.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, a cloud-based computing network, an ad hoc network, an intranet, the Internet, a fiber optic-based network, a cloud computing network, an EVPN-VXLAN network (e.g., an L2 network, an L3 network, a combination of L2 and L3 networks, etc.), another type of EVPN network (e.g., an EVPN-multiprotocol label switching (MPLS) network or the like), a subnet network (e.g., a subnet), and/or a combination of these or other types of networks.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
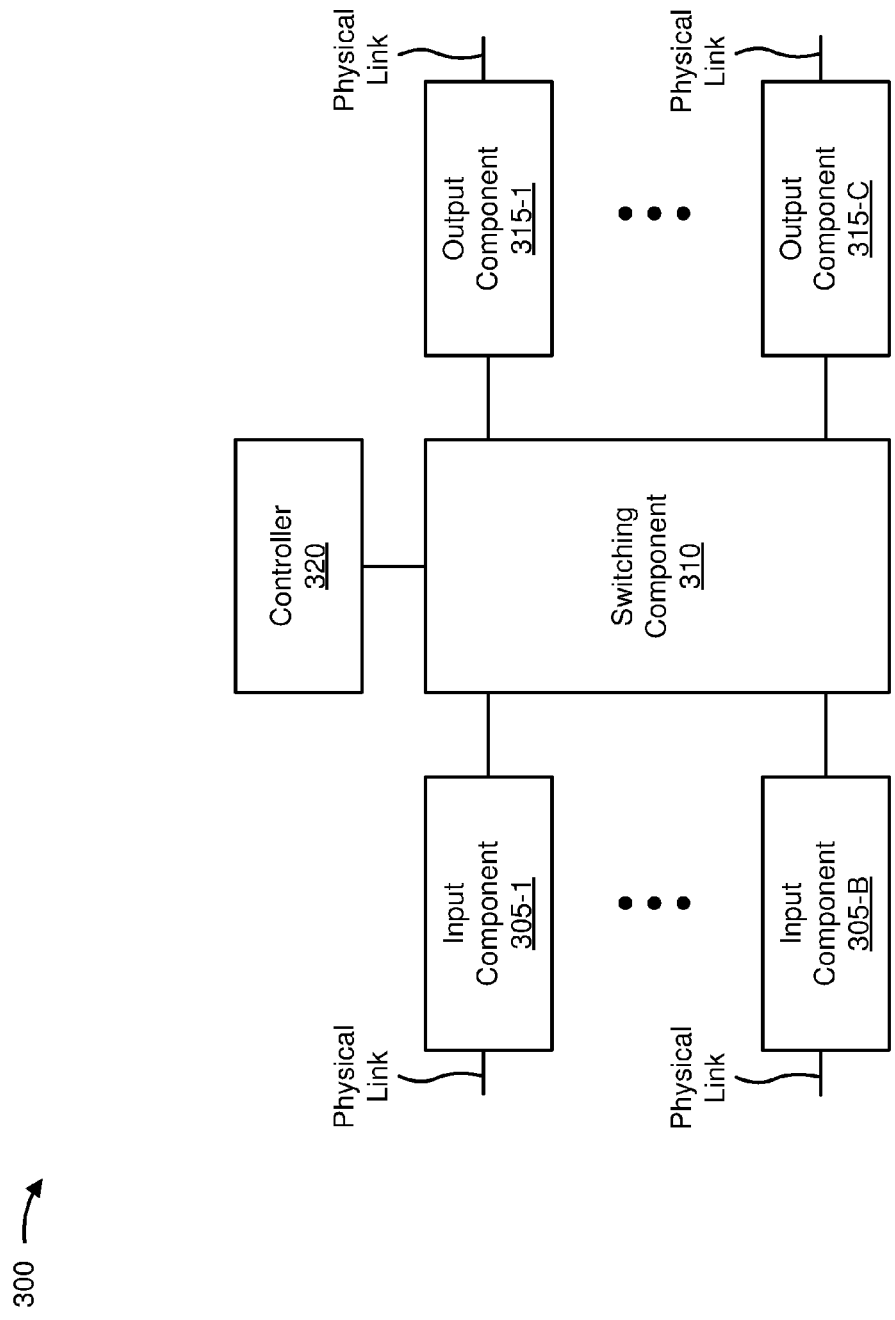
FIG. 3 is a diagram of example components of one or more devices of FIG. 2.

As shown in FIG. 3, device 300 may include a set of input components 305-1, . . . 305-B (B≥1) (referred to individually as input component 305 and collectively as input components 305), a switching component 310, a set of output components 315, . . . , 315-C (C≥1) (referred to individually as output component 315 and collectively as output components 315), and a controller 320. Components of device 300 may interconnect via wired connections, wireless connections, or a combination of wired and wireless connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (i.e., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
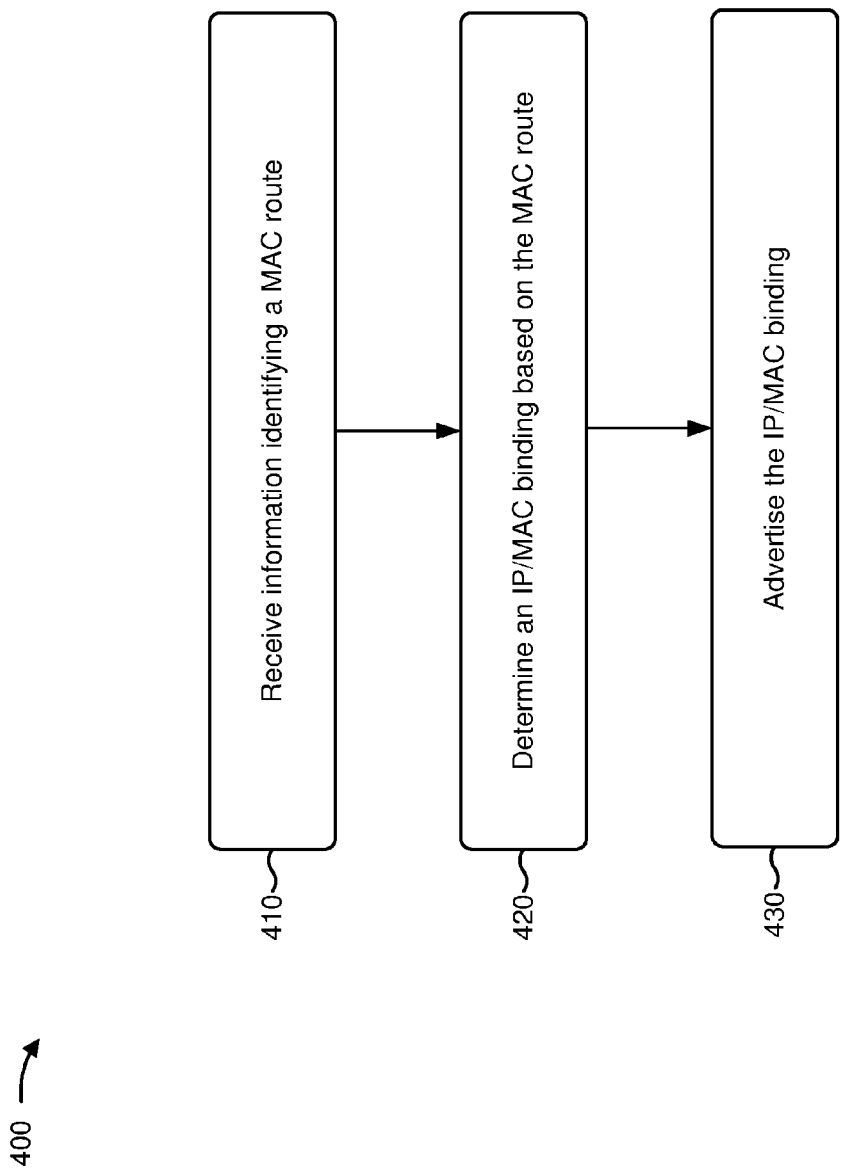
FIG. 4 is a flow chart of an example process for advertising IP/MAC binding information for routing of network traffic in a network.

FIG. 4 is a flow chart of an example process 400 for advertising IP/MAC binding information for routing of network traffic in a network. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include receiving information identifying a MAC route (block 410). For example, network device 210 (e.g., L3 gateway network device 210) may receive information identifying the MAC route for network traffic associated with another network device (e.g., host network device 210). In some implementations, L3 gateway network device 210 may receive the information identifying the MAC route to cause L3 gateway network device 210 to route network traffic for host network device 210. For example, a user may desire to utilize host network device 210 to connect to a subnet of an EVPN-VXLAN network, and may transmit network traffic to a network device 210 (e.g., ToR switch network device 210) to cause the network traffic to be routed to the subnet. In this case, ToR switch network device 210 may determine a MAC address and a corresponding MAC route, and may advertise the MAC route to L3 gateway network device 210 to cause the network traffic to be routed and may fail to include IP/MAC binding information (e.g., as a result of a lack of resources, such as a lack of processing resources, a lack of memory resources, or the like, a lack of the information to determine the IP/MAC binding information, etc.).

In some implementations, L3 gateway network device 210 may receive the information identifying the MAC route via EVPN type 2 route information. For example, L3 gateway network device 210 may receive the EVPN type 2 route information, and may access a data structure of L3 gateway network device 210 to determine whether IP/MAC binding information is stored for the MAC route. In this case, L3 gateway network device 210 may determine that the data structure (e.g., a route table, a forwarding table, or the like), associated with L3 gateway network device 210, does not include information identifying the IP/MAC binding for the MAC route.

As further shown in FIG. 4, process 400 may include determining an IP/MAC binding based on the MAC route (block 420). For example, network device 210 (e.g., L3 gateway network device 210) may determine the IP/MAC binding for the MAC route. In some implementations, L3 gateway network device 210 may determine the IP/MAC binding based on transmitting a request message. For example, L3 gateway network device 210 may transmit an ARP request message to a network device 210 (e.g., an ARP cache network device 210) to cause an ARP response message to be transmitted with the IP/MAC binding. In some implementations, L3 gateway network device 210 may transmit a message to another network device 210 to determine the IP/MAC binding. For example, L3 gateway network device 210 may transmit a broadcast message to network devices 210 to request that a particular network device 210, which stores information identifying the IP/MAC binding (e.g., host network device 210), transmit a response message including the IP/MAC binding. In some implementations, L3 gateway network device 210 may receive a response message (e.g., an ARP response message) including information identifying the IP/MAC binding. For example, L3 gateway network device 210 may cause the ARP cache network device 210 to transmit information identifying an IP address that corresponds to the MAC route. In this case, L3 gateway network device 210 may store reachability information (e.g., network layer reachability information (NLRI)) identifying the IP address.

As further shown in FIG. 4, process 400 may include advertising the IP/MAC binding (block 430). For example, network device 210 (e.g., L3 gateway network device 210) may advertise the IP/MAC binding (e.g., the IP address corresponding to the MAC route). In some implementations, L3 gateway network device 210 may advertise a route associated with the IP/MAC binding. For example, L3 gateway network device 210 may generate and transmit an EVPN type 2 route including the IP/MAC binding information, BGP nexthop information (e.g., that identifies a next device to which network traffic is to be transmitted to cause the network traffic to be routed to host network device 210), ESI information (e.g., that identifies an Ethernet segment that multiple provider edge network devices 210, such as multiple ToR switch network devices 210 or the like, utilize to direct network traffic to a multi-homed host network device 210), or the like.

In some implementations, L3 gateway network device 210 may advertise the IP/MAC binding to one or more other network devices 210. For example, L3 gateway network device 210 may transmit the EVPN type 2 route to one or more provider edge network devices 210 (e.g., one or more ToR switch network devices 210, one or more L3 gateway network devices 210, or the like). In some implementations, L3 gateway network device 210 may cause network traffic to be routed based on transmitting the EVPN type 2 route information identifying the IP/MAC binding. For example, L3 gateway network device 210 may cause L3 gateway network device 210 to route network traffic from a first VXLAN segment to a second VXLAN segment (e.g., to another network device 210). Additionally, or alternatively, L3 gateway network device 210 may cause another L3 gateway network device 210 to route network traffic from a first VXLAN segment of a network to a second VXLAN segment of the network without the other L3 gateway network device 210 being required to transmit an ARP request and receive an ARP response. For example, L3 gateway network device 210 may cause a particular provider edge network device 210 to select a nexthop included in the EVPN type 2 route (e.g., ToR switch network device 210) for routing network traffic, rather than selecting the other L3 gateway network device 210, thereby causing the particular provider edge network device 210 to direct network traffic to host network device 210.

In some implementations, L3 gateway network device 210 may transmit multiple EVPN type 2 route messages advertising the IP/MAC binding. For example, when host network device 210 is a multi-homed host network device 210 (e.g., is connected to multiple ToR switch network devices 210), L3 gateway network device 210 may advertise an EVPN type 2 route for each of the multiple ToR switch network devices 210 (e.g., each EVPN type 2 route advertising one of the multiple ToR switch network devices 210 as a nexthop for routing network traffic to multi-homed host network device 210).

In some implementations, L3 gateway network device 210 may withdraw an IP/MAC binding. For example, when L3 gateway network device 210 receives information from ToR switch network device 210 withdrawing the MAC route, L3 gateway network device 210 may withdraw IP/MAC binding, thereby causing other network devices 210 to avoid attempting to direct network traffic via a withdrawn route.

In some implementations, L3 gateway network device 210 may be removed from a network that includes multiple redundant L3 gateway network devices 210. For example, L3 gateway network device 210 may be disabled. In this case, based on advertising IP/MAC binding information to the other, redundant L3 gateway network devices 210, a likelihood of network traffic loss is reduced relative to the other L3 gateway network devices 210 being required to resolve IP/MAC bindings using ARP messages based on not having received advertised IP/MAC bindings from L3 gateway network device 210. Additionally, or alternatively, when L3 gateway network device 210 is subsequently enabled for the network, network traffic remains routed via the redundant L3 gateway network devices 210 that have received the IP/MAC bindings, rather than via L3 gateway network device 210, thereby reducing a likelihood that network traffic is lost when transmitted to L3 gateway network device 210 which, upon being enabled for the network, may lack IP/MAC binding information.

In some implementations, ToR switch network device 210 may be caused to remap a set of network tunnel end points to a set of L3 gateway network devices 210. For example, based on receiving information identifying a set of MAC routes, ToR switch network device 210 may remap a set of tunnel end points to one or more nearest L3 gateway network devices 210 prior to establishing the set of MAC routes. In this case, ToR switch network device 210 may obtain a default gateway advertisement from the one or more nearest L3 gateway network devices 210 and utilize an associated metric (e.g., an underlay preference metric) to determine the one or more nearest L3 gateway network devices 210. In this way, ToR switch network device 210 permits distributed routing.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, L3 gateway network device 210 advertises IP/MAC binding information for a network device 210 connected to a ToR switch network device 210 without requiring the ToR switch network device 210 to transmit the IP/MAC binding information. Moreover, based on advertising the IP/MAC binding information to other L3 gateway network devices 210, L3 gateway network device 210 may cause the other L3 gateway network devices 210 to be capable of routing network traffic without the other L3 gateway network devices 210 being required to transmit ARP messages. Based on obviating the need for the other L3 gateway network devices 210 to transmit ARP messages, L3 gateway network device 210 may reduce an amount of network traffic of a network relative to IP/MAC binding information not being advertised.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive, via a first message, first route information for directing network traffic for a network,
         the first route information identifying a media access control (MAC) route corresponding to a MAC address associated with a host device connecting to a subnet of the network,
         the first route information failing to include Internet protocol (IP)/MAC binding information associated with the host device;
      transmit a request for IP/MAC binding information associated with the host device;
      receive a response, to the request for IP/MAC binding information, identifying the IP/MAC binding information; and
      advertise, via a second message, second route information for directing network traffic for the network based on receiving the response identifying the IP/MAC binding information,
         the second route information identifying the IP/MAC binding information associated with the host device.

2. The device of claim 1, where the one or more processors are further to:
   receive, via a third message, third route information associated with withdrawing the MAC route; and
   transmit, via a fourth message, fourth route information associated with withdrawing the IP/MAC binding information.

3. The device of claim 1, where the one or more processors, when receiving the first message, are to:
   receive the first message from a switch device;
   determine that the switch device is configured as a layer 2 (L2) only Ethernet virtual private network (EVPN) device; and
   where the one or more processors, when advertising the second route information, are to:
      advertise the second route information based on determining that the switch device is configured as a layer 2 only EVPN device.

4. The device of claim 3, where the switch device is a Top of Rack switch device.

5. The device of claim 1, where the one or more processors when advertising the second route information, are to:
   advertise the second route information to a network device to cause the network device to route other network traffic associated with the MAC route without the network transmitting the request for the IP/MAC binding information.

6. The device of claim 1, where the one or more processors, when transmitting the request for the IP/MAC binding information, are to:
   transmit the request for the IP/MAC binding information via an address resolution protocol (ARP) request message; and
   where the one or more processors, when receiving the response to the request, are to:
      receive the response to the request via an ARP response message.

7. The device of claim 1, where the one or more processors are further to:
   cause the network traffic to be routed to the subnet of the network based on receiving the response identifying the IP/MAC binding information.

8. The device of claim 1, where the network traffic is first network traffic; and
   where one or more processors are further to:
      cause second network traffic to be routed from the subnet of the network toward the host device after causing the first network traffic to be routed to the subnet.

9. A non-transitory computer-readable medium storing instructions, the instructions comprising:
one or more instructions that, when executed by one or more processors of a device, cause the one or more processors to:
receive a first message identifying a media access control (MAC) route associated with directing network traffic for a host device,
the first message not including Internet protocol (IP)/MAC binding information associated with identifying an IP address corresponding to the MAC route;
determine the IP/MAC binding information based on the MAC route included in the first message; and
transmit a second message identifying the IP/MAC binding information based on determining the IP/MAC binding information to one or more network devices,
the one or more network devices being caused to forbear transmission of one or more messages associated with determining the IP/MAC binding information based on receiving the second message.

10. The non-transitory computer-readable medium of claim 9, where the device is a layer 3 (L3) gateway device of a network.

11. The non-transitory computer-readable medium of claim 9, where the one or more instructions, when executed by the one or more processors, further cause the one or more processors to:
receive, a third message identifying the MAC route,
the first message being associated with a first provider edge device,
the third message being associated with a second provider edge device,
the first provider edge device being different from the second provider edge device; and
transmit a fourth message identifying the IP/MAC binding information,
the fourth message including border gateway protocol (BGP) nexthop information associated with the second provider edge device,
the second message including BGP nexthop information associated with the first provider edge device.

12. The non-transitory computer-readable medium of claim 9, where the one or more instructions, that cause the one or more processors to determine the IP/MAC binding information, cause the one or more processors to:
broadcast one or more messages associated with requesting information identifying the IP/MAC binding information; and
receive a response message identifying the IP/MAC binding information based on broadcasting the one or more messages.

13. The non-transitory computer-readable medium of claim 9, where the first message and the second message are Ethernet virtual private network (EVPN) type 2 messages.

14. The non-transitory computer-readable medium of claim 9, where the one or more instructions, when executed by the one or more processors, further cause the one or more processors to:
cause the network traffic to be directed for the host device based on determining the IP/MAC binding information.

15. The non-transitory computer-readable medium of claim 9, where the one or more instructions, when executed by the one or more processors, cause the one or more processors to:
transmit a third message to the one or more network devices to cause the IP/MAC binding information to be withdrawn,
the one or more network devices being caused to forbear usage of the IP/MAC binding information based on receiving the second message.

16. A method, comprising:
receiving, by a device, a message, including information identifying a media access control (MAC) address associated with a first network device, from a second network device,
the first network device being connected to the second network device,
the message not including information identifying an Internet protocol (IP) address corresponding to the MAC address;
determining, by the device, the IP address corresponding to the MAC address based on receiving the message including the information identifying the MAC address; and
advertising, by the device, the IP address corresponding to the MAC address to cause another device, which receives the advertising, to utilize the IP address for routing traffic associated with the first network device,
the other device being different from the first network device and the second network device.

17. The method of claim 16, where advertising the IP address comprises:
advertising the IP address to cause the traffic to be routed between the first network device and a subnet of a network via the second network device.

18. The method of claim 17, where the network is an Ethernet virtual private network (EVPN) network.

19. The method of claim 18, where the message is an EVPN type 2 message.

20. The method of claim 16, further comprising:
receiving, from a particular device, information identifying another IP address corresponding to another MAC address,
the other IP address being determined by the particular device based on the other device receiving another message including the other MAC address and not including the other IP address;
storing the information identifying the other IP address; and
causing other network traffic to be routed based on the information identifying the other IP address.

* * * * *